United States Patent
Ito et al.

(10) Patent No.: US 6,532,564 B1
(45) Date of Patent: Mar. 11, 2003

(54) ENCODER FOR MULTIPLEXING BLOCKS OF ERROR PROTECTED BITS WITH BLOCKS OF UNPROTECTED BITS

(75) Inventors: Hironori Ito, Tokyo (JP); Masahiro Serizawa, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/499,218

(22) Filed: Feb. 7, 2000

(30) Foreign Application Priority Data

Feb. 10, 1999 (JP) .......................................... 11-032122

(51) Int. Cl.$^7$ ............................................. H03M 13/00
(52) U.S. Cl. ...................................................... 714/752
(58) Field of Search .......................... 714/752; 704/229

(56) References Cited

U.S. PATENT DOCUMENTS

| | | | | |
|---|---|---|---|---|
| 5,666,370 A | * | 9/1997 | Ganesan et al. | 714/752 |
| 5,923,679 A | * | 7/1999 | Itoh et al. | 714/752 |
| 6,170,073 B1 | * | 1/2001 | Jarvinen et al. | 714/758 |
| 6,178,535 B1 | * | 1/2001 | Kajala et al. | 714/752 |

FOREIGN PATENT DOCUMENTS

| | | |
|---|---|---|
| JP | 7-15353 | 1/1995 |
| JP | 7-162357 | 6/1995 |
| JP | 9-116440 | 5/1997 |
| JP | 10-22937 | 1/1998 |

\* cited by examiner

*Primary Examiner*—Albert Decady
*Assistant Examiner*—Shelly A Chase
(74) *Attorney, Agent, or Firm*—Dickstein, Shapiro, Morin & Oshinsky, LLP (57) ABSTRACT

An error detection encoder comprises separation circuitry for separating an input signal into a first sequence of error protected bits and a second sequence of error unprotected bits. Calculation circuitry produces an error check sequence from the first sequence and concatenates the error check sequence to the first sequence to produce a third sequence. The second sequence may be further separated into a first sub-sequence of higher significant bits and a second sub-sequence of lower significant bits. A multiplexer is provided for segmenting the third sequence into a plurality of first blocks and segmenting the first sub-sequence into a plurality of second blocks corresponding to the first blocks and multiplexing each of the first blocks with a corresponding one of the second blocks to produce a fourth sequence in which the first and the second blocks are arranged in an alternating order. The second sub-sequence is concatenated to the fourth sequence to produce an output sequence for transmission.

22 Claims, 6 Drawing Sheets

FIG. 3D
INVENTION

ENCODER FOR MULTIPLEXING BLOCKS OF ERROR PROTECTED BITS WITH BLOCKS OF UNPROTECTED BITS

BACKGROUND OF THE INVENTION

1. Field of the Invention

The present invention relates generally to speech coding and more specifically to an improvement to the detection of errors in coded speech signals.

2. Description of the Related Art

In order to allow receive sites to detect errors in a transmitted bit sequence, it is the usual practice to introduce, at the transmit site, redundant bits such as cyclic redundant check (CRC) bits to information bits. However, the error detector at the receive site may fail to detect errors if the received bit sequence contains too many errors to handle. It is known that, for a given number of redundant error check bits, the number of errors which go unnoticed by the error detector tends to increase with an increase in the number of information bits protected by the error check bits. Specifically, in an error detection encoder for coded speech signals, an input bit sequence is separated into a first sequence of higher priorities and a second sequence of lower priorities (i.e., error unprotected bits). The first sequence is used to derive a CRC sequence which is concatenated to the first sequence so that the first sequence is a sequence of error protected bits. The sequence of error protected bits is concatenated to the sequence of error unprotected bits to form an output bit sequence for further processing for transmission.

However, since the number of CRC check bits of the known error detection encoder is fixed and invariable and the operating performance of the error detection decoder at the receive site is determined by the number of CRC check bits contained in a received signal, the error detection decoder cannot increase detectable errors. In addition, if a substantial number of unprotected lower priority bits are consecutively affected by noise during transmission, the quality of the received signal may deteriorate unacceptably.

SUMMARY OF THE INVENTION

It is therefore an object of the present invention to provide an error detection encoder for producing a bit sequence that allows affected bits to be detected at a receive site without using an increased number of redundant error check bits.

According to the present invention, an error detection encoder is provided which comprises separation circuitry for separating an input signal into a first sequence of error protected bits and a second sequence of error unprotected bits, and calculation circuitry for producing an error check sequence from the first sequence and concatenating the error check sequence to the first sequence to produce a third sequence. A multiplexer is provided for segmenting the third sequence into a plurality of first blocks and segmenting the second sequence into a plurality of second blocks corresponding to the first blocks and multiplexing each of the first blocks with a corresponding one of the second blocks to produce a fourth sequence in which the first and the second blocks are arranged in an alternating order.

In one embodiment of the present invention, the input signal is a coded speech signal, and the first sequence comprises higher significant bits of the coded speech signal and the second sequence comprises lower significant bits of the coded speech signal.

Preferably, the separation circuitry is arranged to additionally separate a fifth sequence of error unprotected bits from the input signal in addition to the first and second sequences and this fifth sequence is concatenated to the fourth sequence. In addition, the second sequence has such a length that, if it were corrupted during transmission and were decoded by a speech decoder at a receive site, no unacceptable noise would be produced.

BRIEF DESCRIPTION OF THE DRAWINGS

The present invention will be described in further detail with reference to the accompanying drawings, in which.

DETAILED DESCRIPTION

Figure 1:
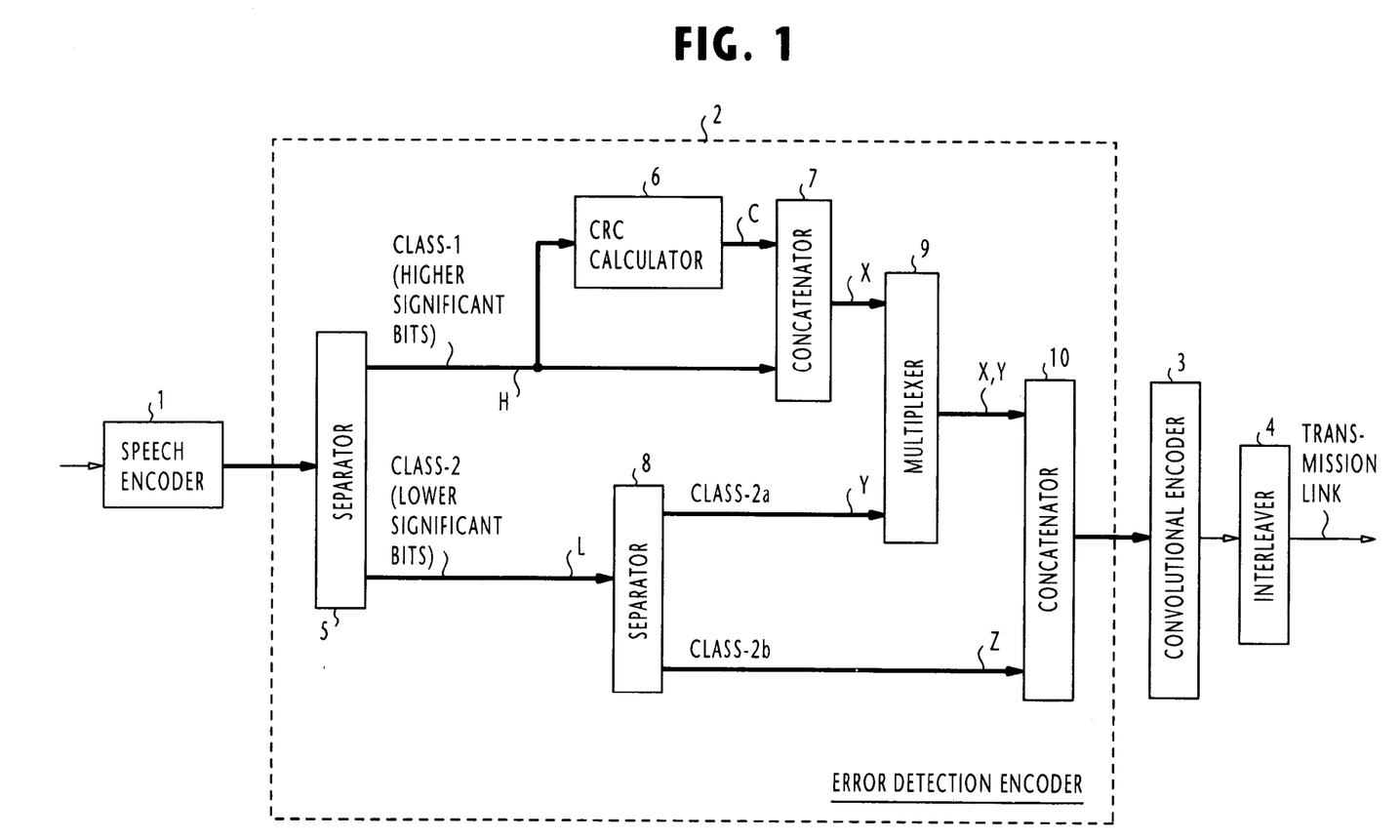
FIG. 1 is a block diagram of a speech transmitter according to the present invention.

Referring now to FIG. 1, there is shown a digital voice signal transmitter according to the present invention. The transmitter includes a digital speech encoder 1 which converts a 64-kbps input speech signal to a lower-bit digital speech signal using a known speech compression technique such as vector sum excited linear predictive (VSELP) coding. The output of the speech encoder 1 is supplied to an error detecting encoder 2 to introduce an error check sequence to the encoded digital speech signal. The output of the error detecting encoder 2 undergoes a forward error correction coding process in a known convolutional encoder 3. The output of the convolutional encoder 3 is then interleaved by an interleaver 4 to achieve reordering of bit sequence and forwarded onto a transmission link.

As illustrated, the error detecting encoder 2 includes a separator 5 which determines the significant position of each bit in a block of the speech signal of encoder 1. Separator 5 splits the input data block into a class-1 bit sequence (H) of higher significant bits and a class-2 bit sequence (L) of lower significant bits. Since higher significant bits, if corrupted, result in the generation of unacceptable noise, they are used by a CRC calculator 6 to produce a CRC error check sequence (C), which is then concatenated to the higher bit sequence (H) in a concatenator 7 to produce a bit sequence X.

The lower significant bit sequence (L) is further subdivided into a class-2a bit sequence (Y) and a class-2b bit sequence (Z) by a separator 8. The bit sequence Y is a sequence of higher significant bit positions than the bit sequence Z and has such a length that the loss or corruption of this portion of speech signal produces no unacceptable noise.

Figure 2:
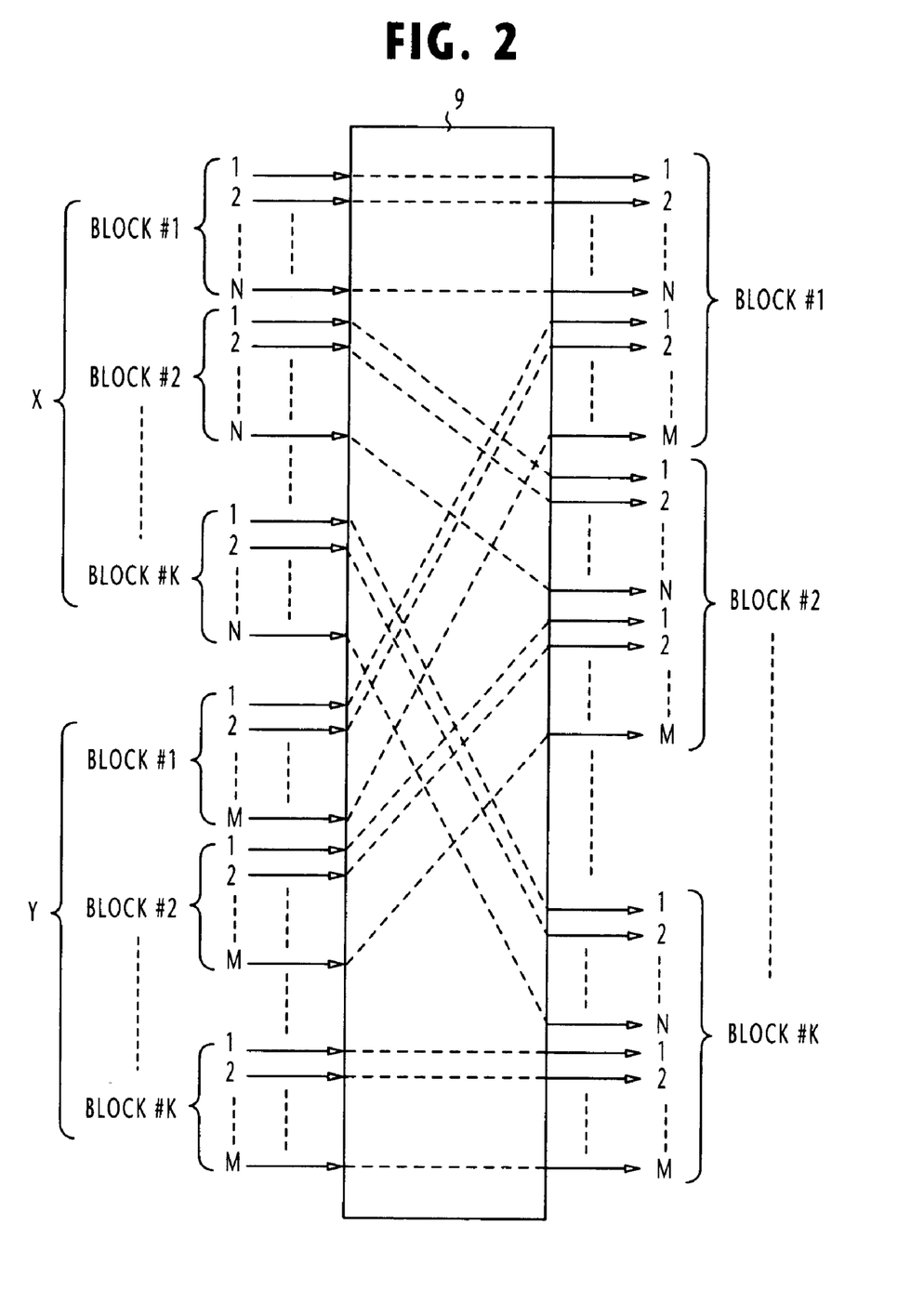
FIG. 2 is a block diagram showing details of the multiplexer of FIG. 1.

The concatenated bit sequence X is then multiplexed with the class-2a bit sequence Y in a multiplexer 9. As illustrated in FIG. 2, the multiplexer 9 divides the bit sequence X into K blocks of N bits each and divides the bit sequence Y into K blocks of M bits each and multiplexes the N bits of each block of the X bit sequence with the M bits of the corresponding block of the Y bit sequence to produce an output sequence. Therefore, in the output sequence of the multiplexer 9, X and Y bits are mixed together with the ratio of N to M. The output of multiplexer 9 is concatenated to the bit sequence Z in a concatenator 10 to produce an output bit sequence X-Y-Z, which is input to the convolutional encoder 3.

The operation of the CRC encoder 2 will be best understood by the following description with the aid of FIGS. 3A to 3E.

Figure 3A:
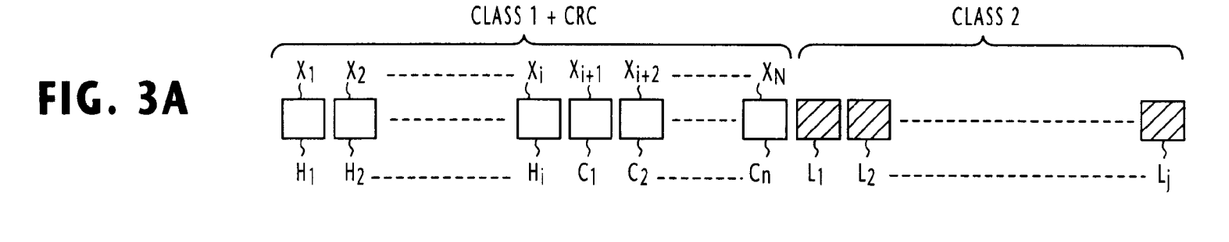
FIGS. 3A to 3D are illustrations of various bit sequences produced in stages according to the present invention.

In FIG. 3A, higher significant bits $H_1$ through $H_i$ of the input speech signal are separated from lower significant bits $L_1$ through $L_j$ of the input speech signal to produce class-1 and class-2 bit sequences. The higher significant bits $H_1$ through $H_i$ are concatenated to CRC error check bits $C_1$ through $C_n$ to produce a sequence of bits $X_1, X_2, \ldots, X_i, X_{i+1}, X_{i+2}, \ldots, X_N$.

Figure 3B:
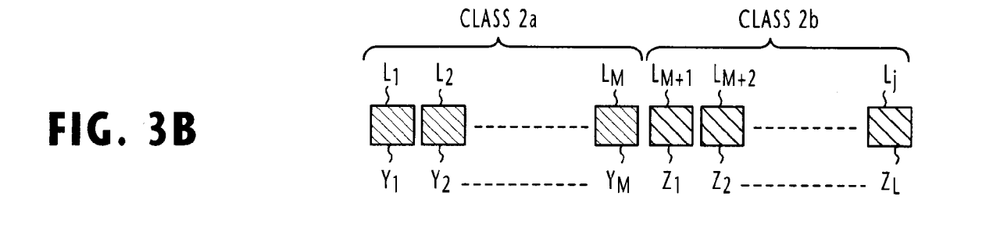

The lower significant bits $L_1$ through $L_j$ are separated into higher significant bits $Y_1$ through $Y_M$ and lower significant bits $Z_1$ through $Z_L$ (see FIG. 3B). As described above, the length M of the bit sequence Y produces no unacceptable noise if all M bits of class 2a are lost or corrupted.

Figure 3C:
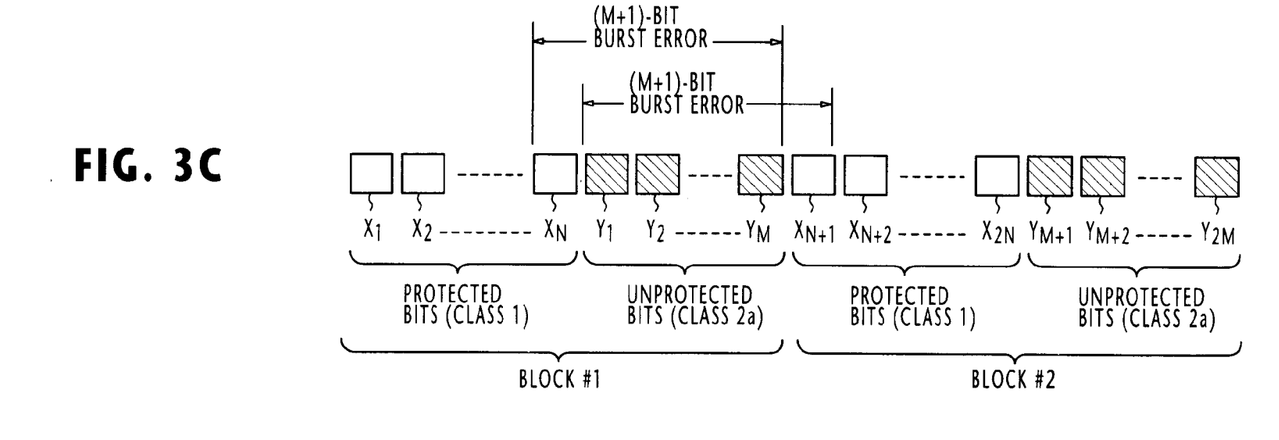

In FIG. 3C, it is shown that N bits $X_1$ through $X_N$ of each block are multiplexed with M bits $Y_1$ through $Y_M$ of the corresponding block. For simplicity, only two blocks of data are illustrated. Since the bit sequence X is the error-protected, class-1 data and the bit sequence Y is the unprotected, class-2 data, the occurrence of a burst error of length M+1 in any position of the multiplexed bit sequence would cause at least one bit error in the protected bit sequence X. For example, a one-bit error occurs in the protected bit sequence X if an (M+1)-bit burst error runs from the bit position $X_N$ to bit position $Y_M$ or runs from bit position $Y_1$ to bit position $X_{N+1}$. If such a burst error occurs in other bit positions, more than one bit will be affected in the protected sequence X.

As will be described later, when the protected bit is lost or corrupted during transmission, a CRC decoder at the receive site will detect it and causes its speech decoder to use the information given by the past uncorrupted bits to avoid the degradation of the quality and intelligibility of speech.

Figure 3D:
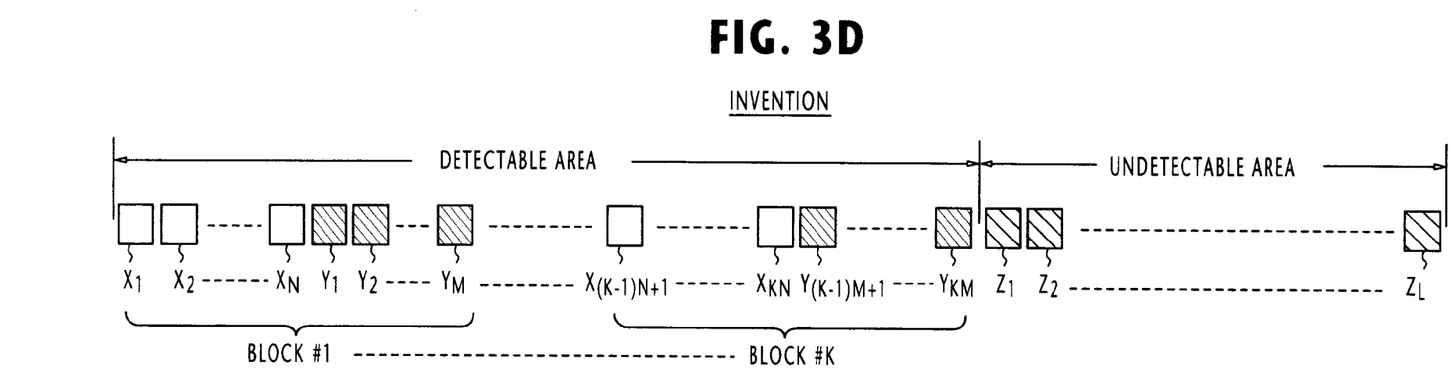
Figure 3E:
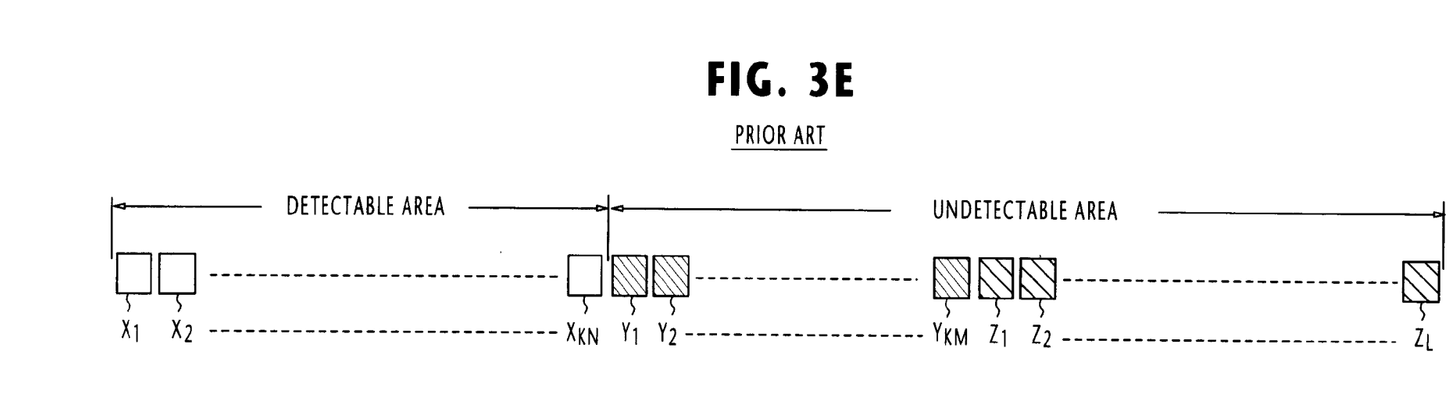
FIG. 3E is an illustration of a bit sequence of the prior art for comparison with the present invention.

In FIG. 3D, K blocks of mixed sequences of X and Y data are concatenated to a class-2b sequence of bits $Z_1 \sim Z_L$.

In the prior art speech encoder, a bit sequence of the same length as discussed above may be arranged as illustrated in FIG. 3E. Error-protected bits $X_1$ through $X_{KN}$ are transmitted consecutively as a group of data, followed by K blocks of unprotected bits $Y_1 \sim Y_{KM}$, and $Z_1 \sim Z_L$. By comparison, the present invention has a larger data area for detecting a burst error in a sequence of given length than the prior art has.

Figure 4:
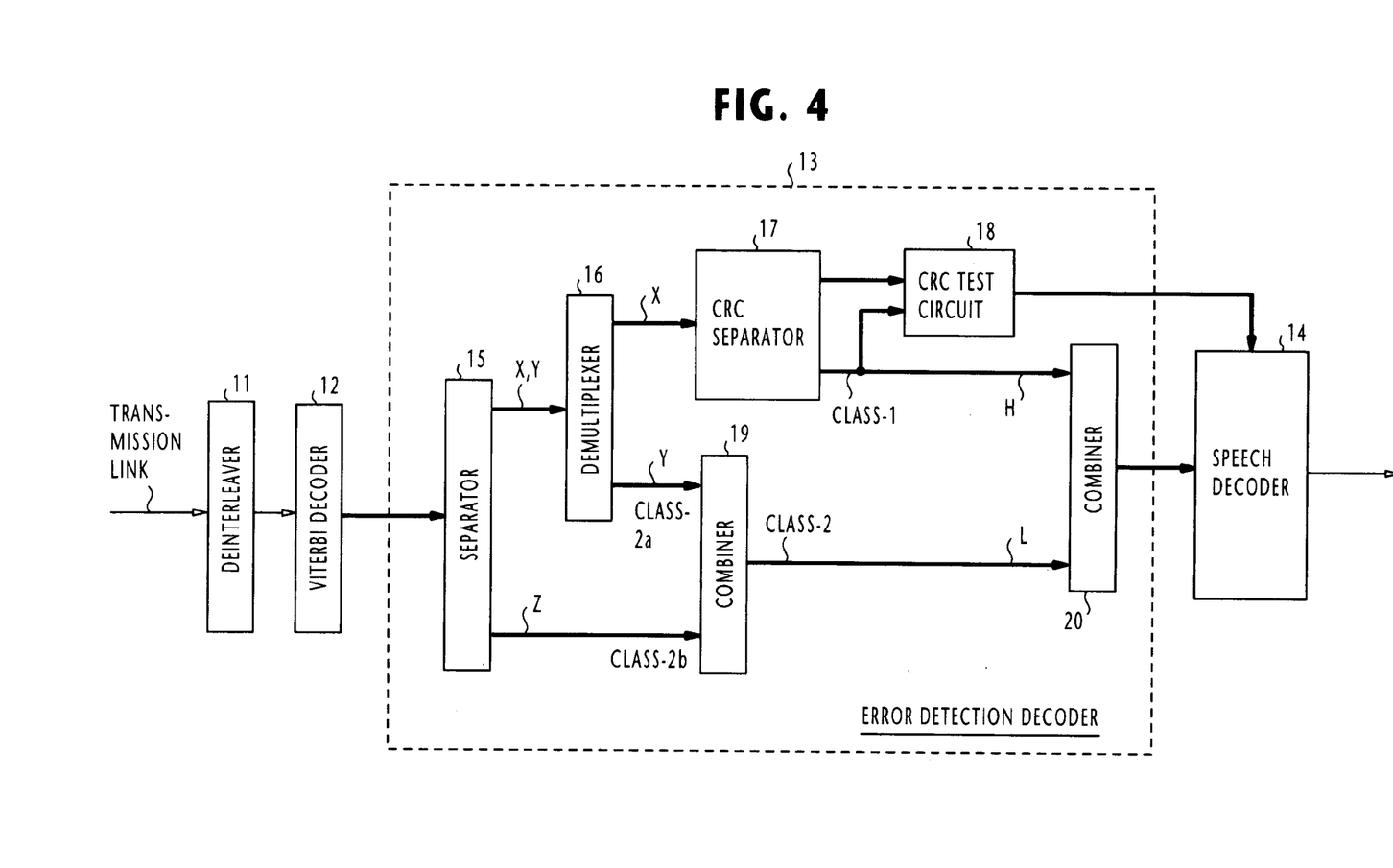
FIG. 4 is a block diagram of a speech receiver of the present invention to be used in conjunction with the speech transmitter of FIG. 1.

The block-interleaved convolutional code sequence of the speech transmitter of FIG. 1 is sent over the transmission link to a speech receiver which is constructed as shown in FIG. 4, where it is deinterleaved by a deinterleaver 11 and error-corrected by a Viterbi decoder 12 in a well known manner.

The output of the Viterbi decoder 12 is input to an error detecting decoder 13, where K blocks of multiplexed sequences of protected class-1 bits and unprotected class-2a bits are separated from a sequence of class-2b bits $Z_1 \sim Z_L$ by a separator 15.

Figure 5:
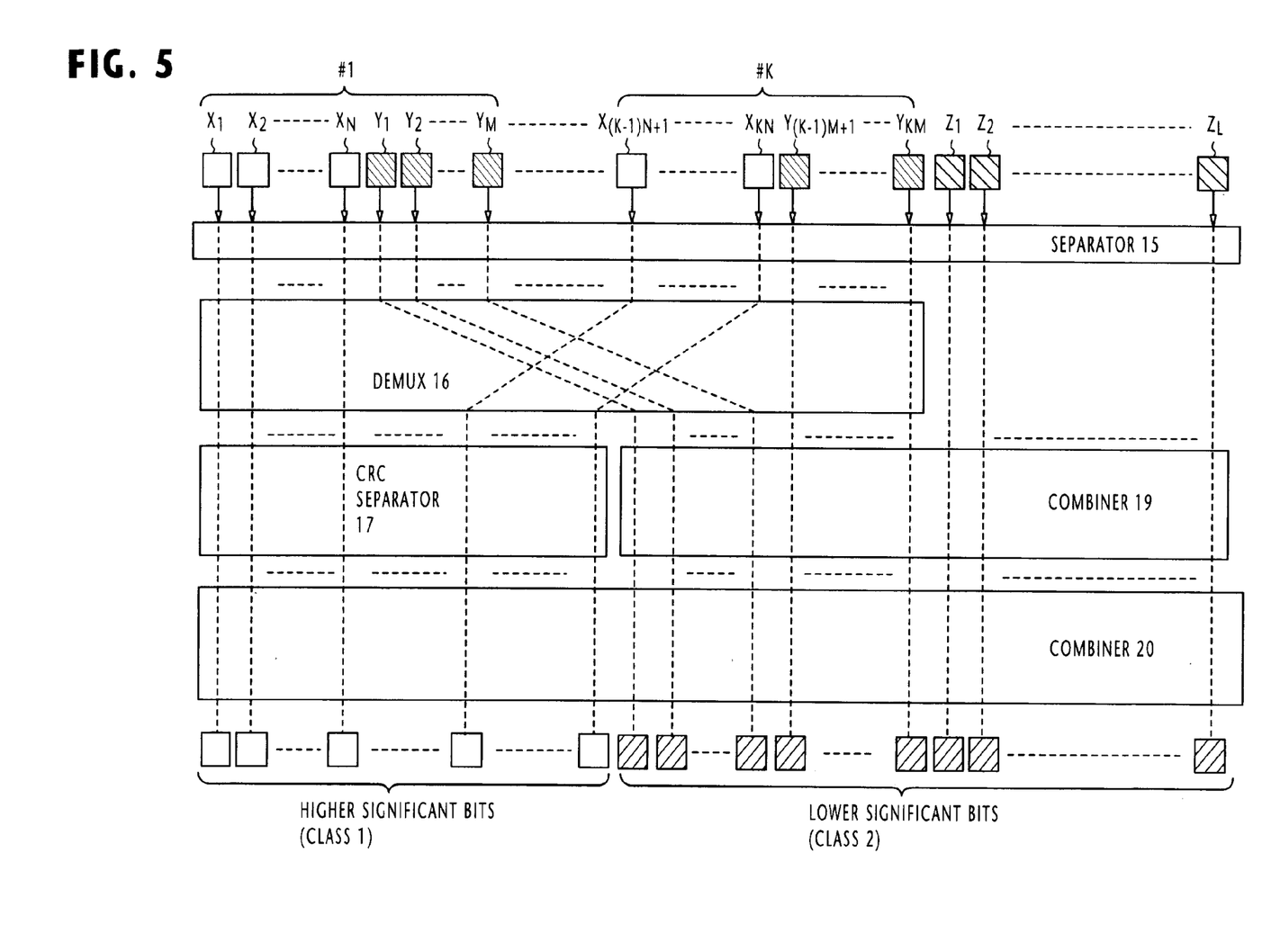
FIG. 5 is a schematic illustration of various bit sequences that are decomposed and rearranged in the error detection decoder of FIG. 4.

The K blocks of multiplexed bits are supplied to a demultiplexer 16 and the class-2b bits are supplied to a combiner 19. As shown in FIG. 5, the protected bits X are demultiplexed from the unprotected bits Y and fed to a CRC separator 17 and the unprotected class-2a bits Y are supplied to the combiner 19 where they are combined with the class-2b bits Z to recover the lower significant bits of the digital speech signal.

In the CRC separator 17, the CRC check bits are removed from the input signal and used by a CRC test circuit 18 to test the higher significant bits $H_1 \sim H_i$ to see if they contain an error. The higher significant bit sequence from the CRC separator 17 and the lower significant bit sequence from the combiner 19 are combined together in a combiner 20 to form the original bit sequence (see also FIG. 5).

If no error is detected by the CRC test circuit 18, the output of the combiner 20 is decoded by a speech decoder 14. If the CRC test circuit detects an error in at least one higher significant bit, it commands to the speech decoder 14 to use a copy of the previous bit, instead of the current error bit. Since the error bit, if simply decoded to reconstruct a speech, would produce noise of unacceptable level, the use of the same bit as in the immediate past serves as a simple, yet efficient means to prevent the degradation of speech quality and the loss of intelligibility.

If a series of consecutive class-2a bits Y is lost or corrupted by a burst error, the speech decoder 14 is allowed to decode these bits since the maximum length of such bits is M which is chosen as a value not producing unacceptable noise if they were decoded.

What is claimed is:

1. An error detection encoder comprising:

separation circuitry for separating an input signal into a first sequence of error protected bits and a second sequence of error unprotected bits;

calculation circuitry for producing an error check sequence from said first sequence and concatenating the error check sequence to said first sequence to produce a third sequence; and a multiplexer for segmenting said third sequence into a plurality of first blocks and segmenting said second sequence into a plurality of second blocks corresponding to said first blocks and multiplexing each of said first blocks with a corresponding one of said second blocks to produce a fourth sequence in which said first and said second blocks are arranged in an alternating order.

2. An error detection encoder as claimed in claim 1, wherein said input signal is a coded speech signal, and wherein said first sequence comprises higher significant bits of the coded speech signal and said second sequence comprises lower significant bits of the coded speech signal.

3. An error detection encoder as claimed in claim 2, wherein said second sequence has such a length that, if the second sequence were corrupted during transmission and were decoded by a speech decoder at a receive site, the speech decoder would produce no unacceptable noise.

4. An error detection encoder as claimed in claim 1, wherein said separation circuitry is arranged to further separate a fifth sequence of error unprotected bits from said input signal, further comprising a concatenator for concatenating said fifth sequence to said fourth sequence.

5. An error detection encoder as claimed in claim 4, wherein said input signal is a coded speech signal comprising higher significant bits and lower significant bits, and wherein said first sequence comprises said higher significant bits of the coded speech signal, said second sequence comprises higher significant bits of said lower significant bits of the coded speech signal, and said fifth sequence comprises lower significant bits of said lower significant bits of the coded speech signal.

6. An error detection encoder as claimed in claim 5, wherein said second sequence has such a length that, if the second sequence were corrupted during transmission and were decoded by a speech decoder at a receive site, the speech decoder would produce no unacceptable noise.

7. An error detection decoder for use in combination with the error detection encoder as claimed in claim 1, comprising:
- a demultiplexer for decomposing said fourth sequence into said first blocks and said second blocks and assembling said first blocks into said third sequence and assembling said second blocks into said second sequence;
- a separator for separating the assembled third sequence into said error check sequence and said first sequence and making a test on said first sequence by using the error check sequence; and
- combining circuitry for combining said first sequence and said second sequence.

8. A communication method comprising the steps of:
a) separating an input signal into a first sequence of error protected bits and a second sequence of error unprotected bits;
b) producing an error check sequence from said first sequence and concatenating the error check sequence to said first sequence to produce a third sequence;
c) segmenting said third sequence into a plurality of first blocks and segmenting said second sequence into a plurality of second blocks corresponding to said first blocks and multiplexing each of said first blocks with a corresponding one of said second blocks to produce a fourth sequence in which said first and said second blocks are arranged in an alternating order; and
d) transmitting said fourth sequence over a communication link.

9. A communication method as claimed in claim 8, wherein the step (a) further comprises the step of further separating a fifth sequence of error unprotected bits from said input signal, further comprising the step of concatenating said fifth sequence to said fourth sequence prior to transmission to said communication link by the step (d).

10. A communication method as claimed in claim 9, wherein said input signal is a coded speech signal, said first sequence comprises higher significant bits of the coded speech signal and said second sequence comprises higher significant bits of the lower significant bits of the coded speech signal, and said fifth sequence comprises lower significant bits of the lower significant bits of the coded speech signal.

11. A communication method as claimed in claim 8, further comprising:
receiving the combined fourth sequence;
decomposing the received fourth sequence into said first blocks and said second blocks and assembling said first blocks into said third sequence and assembling said second blocks into said second sequence;
separating the assembled third sequence into said error check sequence and said first sequence and making a test on said first sequence by using the error check sequence; and
combining said first sequence and said second sequence.

12. A communication method as claimed in claim 11, further comprising the steps of:
decoding the combined first and second sequences to recover a speech signal when no error is detected by said test and recovering a speech signal by using a copy of a previously decoded bit when an error is detected by said test.

13. A communication method as claimed in claim 12, wherein said input signal is a coded speech signal, said first sequence comprises higher significant bits of the coded speech signal and said second sequence comprises lower significant bits of the coded speech signal.

14. A communication method as claimed in claim 11, wherein said input signal is a coded speech signal, said first sequence comprises higher significant bits of the coded speech signal and said second sequence comprises lower significant bits of the coded speech signal.

15. A communication method as claimed in claim 8, wherein said input signal is a coded speech signal, said first sequence comprises higher significant bits of the coded speech signal and said second sequence comprises lower significant bits of the coded speech signal.

16. An error detection device comprising:
an error detection encoder, said encoder comprising:
- a separation circuitry for separating an input signal into a first sequence of error protected bits and a second sequence of error unprotected bits;
- a calculation circuitry for producing an error check sequence from said first sequence and concatenating the error check sequence to said first sequence to produce a third sequence;
- a multiplexer for segmenting said third sequence into a plurality of first blocks and segmenting said second sequence into a plurality of second blocks corresponding to said first blocks and multiplexing each of said first blocks with a corresponding one of said second blocks to produce a fourth sequence in which said first and said second blocks are arranged in an alternating order;
wherein said separation circuitry is arranged to further separate a fifth sequence of error unprotected bits from said input signal;
a concatenator for concatenating said fifth sequence to said fourth sequence; and
an error detection decoder for use with the error detection encoder, said decoder comprising:
- a first separator for separating an incoming bit sequence into said fourth sequence and said fifth sequence;
- a demultiplexer for decomposing the fourth sequence into said first blocks and said second blocks and assembling said first blocks into said third sequence and assembling said second blocks into said second sequence;
- a second separator for separating the assembled third sequence into said error check sequence and said first sequence;
- an error testing circuit for performing a test on said first sequence by using the error check sequence; and
- a combining circuitry for combining said first sequence, said second sequence and said fifth sequence.

17. An error detection decoder as claimed in claim 16, further comprising a speech decoder for decoding the combined first and second sequences to recover a speech signal when no error is detected by said error testing circuit and recovering a speech signal by using a copy of a previously decoded bit when an error is detected by said error testing circuit.

18. An error detection decoder as claimed in claim 16, further comprising a speech decoder for decoding the combined first, second and fifth sequences to recover a speech signal when no error is detected by said testing circuit and recovering a speech signal by using a copy of a previously decoded bit when an error is detected by said testing circuit.

19. A communication method comprising the steps of:

separating an input signal into a first sequence of error protected bits and a second sequence of error unprotected bits;

producing an error check sequence from said first sequence and concatenating the error check sequence to said first sequence to produce a third sequence;

segmenting said third sequence into a plurality of first blocks and segmenting said second sequence into a plurality of second blocks corresponding to said first blocks and multiplexing each of said first blocks with a corresponding one of said second blocks to produce a fourth sequence in which said first and said second blocks are arranged in an alternating order;

wherein the step of separating further comprises the step of separating a fifth sequence of error unprotected bits from said input signal and concatenating said fifth sequence to said fourth sequence prior to transmission to a communication link;

receiving the combined fourth and fifth sequences;

decomposing the combined sequences into said fourth sequence and said fifth sequence, and decomposing the fourth sequence into said first blocks and said second blocks and assembling said first blocks into said third sequence and assembling said second blocks into said second sequence;

separating the assembled third sequence into said error check sequence and said first sequence and performing a test on said first sequence by using the error check sequence; and combining said first sequence, said second sequence and the decomposed fifth sequence.

20. A communication method as claimed in claim 19, further comprising the steps of:

decoding the combined first, second, and fifth sequences to recover a speech signal when no error is detected by said test and recovering a speech signal by using a copy of a previously decoded bit when no error is detected by said test.

21. A communication method as claimed in claim 20, wherein said input signal is a coded speech signal, said first sequence comprises higher significant bits of the coded speech signal and said second sequence comprises higher significant bits of the lower significant bits of the coded speech signal, and said fifth sequence comprises lower significant bits of the lower significant bits of the coded speech signal.

22. A communication method as claimed in claim 19, wherein said input signal is a coded speech signal, said first sequence comprises higher significant bits of the coded speech signal and said second sequence comprises higher significant bits of the lower significant bits of the coded speech signal, and said fifth sequence comprises lower significant bits of the lower significant bits of the coded speech signal.

* * * * *